United States Patent [19]

Moreland

[11] 4,141,751

[45] * Feb. 27, 1979

[54] PROCESS FOR PREPARING MODIFIED PARTICULATE AND/OR FIBROUS, CRYSTALLINE AND AMORPHOUS INORGANIC SUBSTANCES

[75] Inventor: James E. Moreland, Hot Springs, Ark.

[73] Assignee: Malvern Minerals Company, Hot Springs, Ark.

[*] Notice: The portion of the term of this patent subsequent to Oct. 28, 1992, has been disclaimed.

[21] Appl. No.: 787,090

[22] Filed: Apr. 13, 1977

Related U.S. Application Data

[63] Continuation-in-part of Ser. No. 625,362, Oct. 24, 1975, abandoned.

[51] Int. Cl.$^2$ ............................................. C04B 31/40
[52] U.S. Cl. ................................ 106/308 Q; 427/216; 427/217; 427/218; 427/219; 427/220; 106/308 N; 106/309
[58] Field of Search ............ 106/288 B, 308 P, 308 Q, 106/308 N, 309; 427/216, 217, 218, 219, 220

[56] References Cited

U.S. PATENT DOCUMENTS

| | | | |
|---|---|---|---|
| 2,928,802 | 3/1960 | Rehner et al. | 106/288 B |
| 3,132,961 | 5/1964 | Pierpoint | 106/309 |
| 3,227,675 | 1/1966 | Papalos | 106/308 Q |
| 3,567,680 | 3/1971 | Iannicelli | 106/288 B |
| 3,660,134 | 5/1972 | Morris et al. | 106/309 |
| 3,677,784 | 7/1972 | Nitzsche et al. | 106/288 B |
| 3,849,152 | 11/1974 | Mimeault | 106/309 |
| 3,915,735 | 10/1975 | Moreland | 106/309 |
| 3,929,718 | 12/1975 | Kratel et al. | 106/308 Q |
| 3,948,676 | 4/1976 | Laüfer | 106/308 N |

OTHER PUBLICATIONS

The Condensed Chemical Dictionary, 8th ed., Van Nostrand Reinhold Co., p. 859.

*Primary Examiner*—R. Dean
*Assistant Examiner*—John P. Sheehan
*Attorney, Agent, or Firm*—George F. Helfrich

[57] ABSTRACT

A silane coupling agent of either ambi or monofunctional type, and/or an isopropyl titanate coupling agent of either ambi or monofunctional type; and/or, a glass resin thermoset silicone coupling agent of either ambi or monofunctional type which is refined siloxane chain/s with select OH groups in a carrier solution is and are sprayed or poured into hydrophilic particulate and/or fibrous, crystalline and/or amorphous inorganic substances or compounds in a high intensity mixing apparatus between about 70° F. and 350° F. and a silane coupling agent of either ambi or monofunctional; and/or an isopropyl titanate coupling agent of either ambi or monofunctional type; and/or, a glass resin thermoset silicone coupling agent of either ambi or monofunctional type which is refined siloxane chain/s with select OH groups in a carrier solution and hydrophilic particulate and/or fibrous, crystalline and/or amorphous inorganic substances are allowed to remain in situ at a temperature between 70° F. and 350° F. for at least about 1 minute.

4 Claims, No Drawings

PROCESS FOR PREPARING MODIFIED PARTICULATE AND/OR FIBROUS, CRYSTALLINE AND AMORPHOUS INORGANIC SUBSTANCES

CROSS REFERENCE

This application is a continuation-in-part of my copending application Ser. No. 625,362, filed Oct. 24, 1975 now abandoned.

BACKGROUND OF THE INVENTION

1. Field of the Invention

This invention relates in general to particulate, fibrous and amorphous filler/extenders and pigments for functional use in improving or enhancing the physical, as well as aesthetic, properties of simple polymeric compositions, polymeric alloys, and combinations of polymeric and ceramic compositions or alloys. It relates generally to all inorganic particulate and/or fibrous extender/filler/pigment substances any and all of which are terminated at faces or fractured surfaces in ions which are unsaturated and possess free valencies inasmuch as typical solids made up of three dimensional continuous atomic latices must be interrupted at terminal faces and fractured surfaces. See in this regard: (1) Iler, "The Colloid Chemistry of Silica and Silicates", Cornell University Press, New York, 1955, at P. 258; and (2) Angewandte Chemie, International Edition, Vol. 5, No. 6, June 1966, at P. 533.

2. Prior Art

In the commercial and industrial utilization of polymeric compositions, both simple and alloy, of polymeric and ceramic composites and alloys both fabricated and non-fabricated articles and systems, it is very frequently desired that the composition employed contains either/or (and both, or all three) fillers, pigments and fibrous substances of some kind/s. Inert reinforcing and non-reinforcing fillers, extenders and pigments render polymeric/polymeric alloy compositions less expensive and more readily processable notwithstanding positive contributions in the way of physical, chemical and electrical properties as tensile strength, impact strength, tear resistance, and dielectric constant and strength.

Many polymeric compositions virtually useless along are converted into highly serviceable and aesthetic products by combining them with the proper amounts/s of appropriate particulate and/or fibrous extender/filler pigments. The action of the extender/filler particulate or fibrous pigment substances is dependent upon their natures, the type of polymer(s) or ceramic combinations with which they are employed, and the actual amount (filler-loading and/or pigment volume concentration) of extender/filler pigment, particulate or fibrous, present in the combined mixture.

The presence of surface ions in an unsaturated state at faces, fractured or amorphous surface exposing free unsatisfied valencies has inspired attempts to modify the surface functionality of extender/filler/pigment, particulate, fibrous or amorphous, to yield increased reactivity and consequent two and three dimensional coupling with the polymer or polymer/ceramic matrix either, or and all polymer/particulate, polymer/particulate/fibrous double and triple interfacial activities. Initial studies have lent encouragement to the proposition that such a modification might be effected using silane coupling agents. Reference is made to R. L. Kass, et al., "Interaction of Alkoxy Silane Coupling Agents With Silica Surfaces", *Polym. Eng. Sci.* 1971, 11(1), 11–18; M. L. Hair, et al., "Reactions of Chlorosilanes With Silica Surfaces", *J. Phys. Chem.* 1969, 73 (7), 2372-8; and S. Sterman, et al., "Silane Coupling Agents as Intergral Blends in Resin-Filler Systems". *Modern Plastics*, July 1963, 125–138. Moreover, reference is also made to the following U.S. Patents, which form a background against which the present invention stands out as a valuable, novel, and unobvious advance: U.S. Pat. Nos. 3,660,134 (Morris); 3,948,676 (Laufer); 3,929,718 (Fratel); and 3,849,152 (Mimeault). However, extensive commercial utilization of silane/s, isopropyl titanate analogs and glass resin modified particulate, fibrous and amorphous filler/extender pigments has been delayed because of the relatively high cost, lack of understanding, and current ineffective versatile production techniques and/or the variations of their effectiveness.

SUMMARY OF THE INVENTION

It is consequently the primary object of this invention to provide what is unavailable in the prior art, viz, a very simple and economical, yet highly efficient and efficacious process for modifying the surface functionality of hydrophilic particulate and/or fibrous crystalline and/or amorphous inorganic substances so that they are readily available and eminently suitable for use as reinforcing filler/extender pigments in polymeric, polymeric alloy, and polymeric/ceramic alloy compositions.

This object is achieved, and the disadvantages of prior art are obviated by the practice of a process which comprises spraying or pouring between 0.01 and 5.0 percent by weight of an ambi- or monofunctional treating agent such as a silane coupling agent, an isopropyl titanate coupling agent and/or its analogs, and glass resins thermoset silicone coupling agents (siloxane chains with select OH groups) onto essentially dry, hydrophilic particulate, fibrous and amorphous filler/extender pigments which singly or combined is/are being agitated in a high intensity mixing apparatus at a temperature between 70° F. and 350° F. The particulate and/or fibrous crystalline and/or amorphous inorganic substances and the silane coupling agent of either ambi or monofunctional; and/or an isopropyl titanate coupling agent of either ambi or monofunctional type; and/or, a glass resin thermoset silicone coupling agent of either ambi or monofunctional type which is refined siloxane chain/s with select OH groups in a carrier solution are allowed to remain in contact in situ at a temperature between 70° F. and 350° F. for at least 1 minute. Especially advantageous results are achieved when: (a) particulate and/or fibrous crystalline and/or amorphous inorganic substances is/are inorganic substances terminated in unsaturated surfaces in ions and/or reactive hydroxyl functionalities; (see in this regard: (1) Iler, "The Colloid Chemistry of Silica and Silicates", Cornell University Press, New York, 1955, at P. 258 and (2) Angewandte Chemie, International Edition, Vol. 5., No. 6, June 1966, at P. 533); and (b) the silane coupling agent of either ambi or monofunctional; and/or an isopropyl titanate coupling agent of either ambi or monofunctional type; and/or, a glass resin thermoset silicone coupling agent of either ambi or monofunctional type which is refined siloxane chain/s with select OH groups in a carrier solution is/are substances with only a single hydrolyzable group (monofunctional), or, with both an hydrolyzable group and a functional group having the respective general formulae: Non-reactive$^n$—Si—X$_3$, R—Si—X$_3$; Non-reactive$_3^n$—Ti—X; and

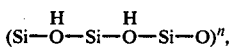
$$(Si-O-Si-O-Si-O)^n,$$

where Non-Reactive$^n$ is a group such as single or multiple methyl groups attached to the silicon in a thermally and hydrolytically stable manner; R is a group attached to the silicon in a thermally and hydrolytically stable manner; and, X$_3$ is a hydrolyzable group having a monoalkoxy structure. Active or Non-Reactive R$_3^n$ is a tri isostearate group

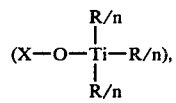
$$(X-O-Ti-R/n),$$

and its analogs, is attached to the titanium in a thermally and hydrolytically stable manner; and, X is a single hydrolyzable group; and, glass resin thermoset silicone coupling agent being refined from more complex silanes to be siloxane chains with select OH groups.

DESCRIPTION OF THE PREFERRED EMBODIMENTS

In accordance with the process of the present invention, the particulate and/or fibrous crystalline and/or amorphous inorganic substances are solids known as both low aspect and high aspect ratio filler/extender pigments. The term low aspect and high aspect ratio is also known as l/d ratio or length divided by diameter of said filler/extender pigment of either particulate and/or fibrous, crystalline and/or amorphous solids.

The ambi- or monofunctional silane coupling agent employed in the process of the present invention is advantageously an organosilicon compound having the general formula R—SiX,, wherein R is a group attached to the silicon in a thermally and hydrolytically stable manner, R being selected from the class consisting of aliphatic, cycloaliphatic, aromatic, amino, polyamino, mercapto, methacrylo, glycidoxy, epoxy, vinyl, aminopropyl, mercaptopropyl, methacrylopropyl, methacryloxypropyl, glycidoxypropyl, epoxypropyl, chloroalkyl, and epoxycyclohexyl; and X is a hydrolyzable group selected from chlorine, bromine, iodine, alkoxy, and acetoxy.

The ambi- or monofunctional isopropyl titanate coupling agent employed in the process of the present invention is advantageously an organotitanium compound having the general formula R$_3$—TiX, wherein R is a group attached to the titanium in a thermally and hydrolytically stable manner, R being selected from the class consisting of isostearoyl, lauryl-myristyl, isopropyl, dimethacryl, triacroyl, dodecylbenzenesulfonyl, diacryl, diisooctylphospheto, phosphito, 4-amino benezenesulfonyl, dioctylphrophos phato, and X is a hydrolyzable group having a monoalkoxy structure.

The ambi- or monofunctional glass resin thermoset silicone coupling agent employed in the process of the present invention is advantageously a structure comprising siloxane chains having the abbreviated formula

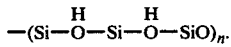
$$-(Si-O-Si-O-SiO)_n.$$

Interaction of a silane coupling agent of either ambi or monofunctional; and/or an isopropyl titanate coupling agent of either ambi or monofunctional type; and/or, a glass resin thermoset silicone coupling agent of either ambi or monofuctional type which is refined siloxane chain/s with select OH groups in a carrier solution is effected according to the process of the present invention by spraying or pouring the liquid silane, titanate analog or glass resin onto the particulate and/or fibrous, crystalline and/or amorphous inorganic substances while the particulate and/or fibrous, crystalline and/or amorphous inorganic substances is being agitated in a high intensity mixing apparatus. Solvents and/or diluents such as n-heptane are not present in the process of the present invention — i.e., the instant process is a "dry blending", as opposed to "slurry blending" process. Moreover, the present process is distinguished from one in which a bed of particulate and/or fibrous, crystalline and/or amorphous inorganic substances is merely "tumbled" while the liquid silane, titanate analog or glass resin reactant is poured thereon. In the present invention the particulate and/or fibrous, crystalline and/or amorphous inorganic substances is subjected to intense agitation by means of a "high intensity" mixing apparatus, a number of which are available commercially for large scale blending operations. The "high intensity" mixing comprehended by the process of the present invention is exemplified by the employment of an apparatus comprising a mixing chamber and a plurality of mixing blades or discs of 1–2 feet in diameter, which, attached to a shaft passing through the chamber, are driven at 200–18,000 RPM. Quite advantageously, the frictional heat generated in the particulate and/or fibrous, crystalline and/or amorphous inorganic substances by such intense agitation is employed to effect the interaction between liquid silane, titanate analog or glass resin and particulate and/or fibrous, crystalline and/or amorphous inorganic substances. That is to say, the peripheral speed of the agitating blade or disc — which is a function of of shaft revolutions per minute and blade or disc diameter — and the time of agitation are directly related to the temperature of the agitated particulate and or fibrous, crystalline and/or amorphous inorganic substances, and both peripheral speed and time are taken into consideration in effecting a temperature between about 70° F. and about 350° F. in the agitated particulate and/or fibrous, crystalline and/or amorphous inorganic substances, after which the liquid silane, titanate analog, or glass resin reactant is sprayed or poured thereupon. Of course, additional heat from external sources may also be applied, if desired for any reason; however care should be taken to ensure that the temperature of the agitated solid is between 70° and about 350° F. before the treating agent is added.

Liquid silane coupling agent, titanate analog or glass resin is added to the intensely agitated particulate and/or fibrous, crystalline and/or amorphous inorganic substances, in an amount sufficient to provide between about 0.01 and about 5.0 percent by weight of silane, based upon the weight of the particulate and/or fibrous, crystalline and/or amorphous inorganic substances. Less than this amount will not result in a modified particulate and/or fibrous, crystalline and/or amorphous inorganic substances, and more than this amount will not afford any additional improvement. The silane coupling agent, titanate analog, or glass resin and particulate and/or fibrous, crystalline and/or amorphous inorganic substances are then allowed to remain in intimate contact preferably under intense agitation, at some temperature between about 70° F. and 350° F. for at least about one minute, and preferably for at least about 5 minutes, in order that the interaction between liquid silane, titanate analog, or glass resin and particulate and/or fibrous, crystalline and/or amorphous inorganic substances be essentially completed. At the completion of the reaction, the modified particulate and/or fibrous, crystalline and/or amorphous inorganic substances is cooled and removed from the mixing chamber for utilization in the enhancement of properties of polymeric compositions.

When, in the practice of the present invention, a silane coupling agent of either ambi or monofunctional; and/or an isopropyl titanate coupling agent of either ambi or monofunctional type; and/or, a glass resin thermoset silicone coupling agent of either ambi or monofunctional type which is refined siloxane chain/s with select OH groups in a carrier solution are employed, it has been found of special advantage to use an interaction temperature of at least about 300° F. for at least about 1 minute. Undesirable agglomeration of the particles of particulate and/or fibrous, crystalline and/or amorphous inorganic substances which would otherwise be present when these liquid silanes, titanate complexes or glass resins are employed — is thereby avoided, and a finely-divided, homogeneous product is produced which is highly efficacious and completely acceptable as a reinforcing filler in polymeric ceramic compositions. For example, this technique is especially applicable when one or more of the following commercially-available silanes is utilized: gamma-glycidoxypropyltrimethyoxysilane; aminotrimethoxysilane; and polyaminotrimethoxysilane.

Physical, chemical, and electrical properties (such as flexural strength, moisture and chemical resistance, and dielectric constant) of thermoplastic, thermosetting, and elastomeric polymer compositions (such as polyvinyl chloride, room temperature — cured epoxy resins, and diallylphthalate resins) have been significantly enhanced by the incorporation therein of about 5 to about 75 percent by weight of particulate and/or fibrous crystalline and/or amorphous inorganic substances modified according to the process of the present invention using standard methods of blending, curing (where applicable) and fabrication. These results were especially significant when compared with those resulting from the use of (a) unmodified particulate and/or fibrous, crystalline and/or amorphous inorganic substances; (b) a silane coupling agent of either ambi or monofunctional; and/or an isopropyl titanate coupling agent of either ambi or monofunctional type, and/or, a glass resin thermoset silicone coupling agent of either ambi or monofunctional type which is refined siloxane chain/s with select OH groups in a carrier solution modified with a silane coupling agent, titanate analog, or glass resin coupling agent according to the "slurry blending" process well known in the art, and (c) particulate and/or fibrous, crystalline and/or amorphous inorganic substances modified with a silane according to the "dry tumbling" process well known in the art.

EXAMPLE ONE

PRODUCT TREATED 1000 pounds of titanium dioxide whether rutile, sulfate process or chloride process with average particle size of about 0.06 to 0.25 microns.

TREATING AGENT USED

A methyl trimethoxysilane coupling agent — empirical formula $CH_3Si(OCH_3)_3$.

MIXER

Myers Engineering 550 Series Dual Range Dispenser with tub for mixing, and other convenient and necessary appurtenances.

A quantity of titanium dioxide weighing 1,000 pounds is placed in the mixing tub. After insertion of the titanium dioxide the temperature is measured at 72° F. The lid over the tub is secured. The single speed, high speed shaft with a circular mixing disc is switched on. Next, the variable speed slow speed shaft with a blade is switched on to its maximum speed setting of 10.

After both shafts have been switched on and the temperature of the titanium dioxide mass in the tub has reached 140° F. the single speed, high speed shaft is stopped while the slow speed shaft is allowed to operate on a setting of 10. Next 10 pounds of methyl trimethoxy silane is fed by gravity through an ½ inch pipe under a portable reservoir on legs, into and through an opening in the tub cover directly on and into the bed of titanium dioxide being agitated by the slow speed shaft operating on a setting of 10. After the 10 pounds of methyl trimethoxy silane has evacuated the reservoir on and into the mass of agitated titanium dioxide, the opening on the tub lid is closed and the single speed, high speed shaft is at once switched on.

When the agitated mass of titanium dioxide has attained a temperature of 300° F. as determined by probing thermometer the treatment of hydrophobizing is considered complete and the shafts are turned off. The treated material is then removed from the tub by screw conveyor, elevated by bucket elevator, into a storage bin from which by air fluidized packers it is packaged in multiwall bags or other suitable containers.

The titanium dioxide treated under this example is used as a non-water wicking, hiding pigment dispersed in a solvent based coating system or electrostatic dry coatings powder formulae well known in the art. One direct benefit of this type of surface treated titanium dioxide is vastly improved, non-conglomerating dry dispersion properties in an electrostatic dry coatings powder system of various polymers. Another direct benefit to this hydrophobized titanium dioxide in solvent, hydrocarbon based systems is non-water wicking of moisture into the composite due to hydrophobicity.

EXAMPLE TWO

PRODUCT TREATED 1000 pounds of aluminum trihydrate with average particle size of 0.38 to 8.5 microns and a surface area of 1 to 15 $m^2/g$.

TREATING AGENT USED

A gamma-Mercapto-propyltrimethoxy silane coupling agent — empirical formula $HSCH_2CH_2Si(OCH_3)_3$.

MIXER

Myers Engineering 550 Dual Range Dispenser with tub for mixing, and other convenient and necessary appurtenances.

A quantity of aluminum trihydrate weighing 1000 pounds is placed in the mixing tub. After insertion of the aluminum trihydrate the temperature is measured at 70° F. The lid over the tub is secured. The single speed, high speed shaft with a circular mixing disc is switched on. Next, the variable speed slow speed shaft with a blade is switched on to its maximum speed setting of 10.

After both shafts have been switched on and the temperature of aluminum trihydrate mass in the tub has reached 140° F. the single speed, high speed shaft is stopped while the slow speed shaft is allowed to operate on a setting of 10. Next 10 pounds of gamma-Mercapto-propyltrimethoxysilane is fed by gravity through an ½ inch pipe under a portable reservoir on legs, into and through an opening in the tub cover directly on and into the bed of aluminum trihydrate being agitated by the slow speed shaft operating on a setting of 10. After the 10 pounds of gamma-Mercapto-propyltrimethoxysilane has evacuated the reservoir on and into the mass of agitated aluminum trihydrate, the opening on the tub lid is closed and the single speed, high speed shaft is at once switched on.

When the agitated mass of aluminum trihydrate has attained a temperature of 300° F. as determined by probing thermometer the treatment is considered complete and the shafts are turned off. The treated material is then removed from the tub by screw conveyor, elevated by bucket elevator, into a storage bin from which it is packaged in multiwall bags or other suitable containers by ram-air fluopacker.

The aluminum trihydrate treated under example is used as a processing aid and particulate reinforcement in foamed plastic tubing and other types of elastomeric foams of variable densities. The surface treated aluminum trihydrate would also perform in like manner in non-foamed, heavier density elastomers of various polymeric systems where mercapto functionality would bond chemically at the interface between matrix and particulate.

EXAMPLE THREE

PRODUCT TREATED 1500 pounds of cryptocrystalline quartz (tripoli) product measuring 99% less than 10 microns and 25% less than one (1) micron.

TREATING AGENT USED

A gamma-Amino-propyl-tristhoxysilane coupling agent — empirical formula $H_2NCH_2CH_2CH_2Si(OC_2H_5)_3$.

MIXER

Myers Engineering 550 Series Dual Range Disperser with tub for mixing, and other convenient and necessary appurtenances.

A quantity of cryptocrystalline quartz (tripoli) weighing 1500 pounds is placed in the mixing tub. After insertion of the cryptocrystalline quartz (tripoli) the temperature is measured at 70° F. The lid over the tub is secured. The single speed, high speed shaft with a circular disc is then switched on. Next, the variable speed shaft with a blade is turned on to its maximum setting of 10.

5½ minutes after both shafts had been switched on the temperature of the cryptocrystalline quartz (tripoli) is 140° F. as determined by probing thermometer.

Immediately and while the single speed, high speed shaft is operating the slow speed shaft is reduced to a setting of one (1). Next, 15 pounds of the liquid gamma amino coupling agent is fed by gravity through an ½ inch pipe under a portable reservoir on legs, into and through an opening in the tub cover directly on and into the bed of cryptocrystalline quartz (tripoli) being agitated by both high and slow speed shafts. After the 15 pounds of gamma amino coupling agent has evacuated the reservoir on and into the mass of agitated cryptocrystalline quartz (tripoli) the opening on the tub lid is closed and the slow speed shaft is at once increased to a setting of 10.

38½ minutes after the initial starting of both the single speed, high speed shaft and the variable slow speed shaft, the probing thermometer has reached 300° F.

The treatment is considered complete and the shafts are turned off. The treated material is then removed from the tub by screw conveyor, elevated by bucket elevator, into a storage bin from which by air fluidized packers it is packaged in multiwall bags or other suitable containers.

The cryptocrystalline quartz (tripoli) treated under this example is used as a reinforcing extender/filler in molded nylon or extruded nylon units wherein the physical properties such as flexural, tensile and heat distortion properties are upgraded as compared to unfilled nylon units. The cryptocrystalline quartz (tripoli) filled nylon units also retain good physical properties as opposed to poor physical properties for the unfilled nylon after the nylon units filled and unfilled have been subjected to prolonged moisture saturation.

EXAMPLE FOUR

PRODUCT TREATED 1700 pounds of a Microcrystalline Novaculite measuring 100% less than 10 microns and 3% less than one micron with an average particle size of about 3.0 microns.

MONOFUNCTIONAL COUPLING AGENT CHEMICAL USED

A triisostearate isopropyl titanate coupling agent, empirical formula, or analogs.

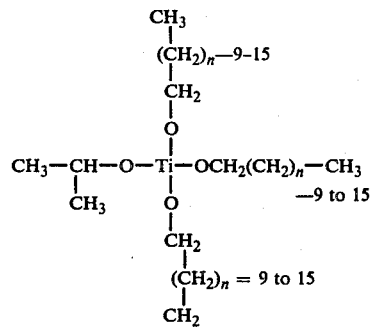

MIXER USED

Myers Engineering 550 Series Dual Range Disperser with tub for mixing, and other convenient and necessary appurtenances.

A quantity of misrocrystalline novaculite weighing 1700 pounds is placed in the mixing tub. After insertion of the microcrystalline novaculite the temperature is measured at 70° F. The lid over the tub is secured. The single speed shaft with a circular disc is then switched on. Next the variable speed shaft with a blade is turned on to its maximum setting of 10.

10 minutes after both shafts had been switched on the temperature of the microcrystalline novaculite is 140° F. as determined by probing thermometer. Immediately and while the high speed shaft is operating and the variable speed shaft is operating at 10, 17 pounds of liquid triisostearate isopropyl titanate is fed by gravity through an ½ inch pipe under a portable reservoir on legs, into and through an opening in the tub cover directly on and into the microcrystalline novaculite being agitated by both the high and variable speed shafts. After the 17 pounds of triisostearate isopropyl titanate has evacuated the reservoir on and into the mass of agitated microcrystalline novaculite the opening on the tub lid is closed.

42 minutes after the initial starting of both the high and variable speed shafts, the probing thermometer has reached 300° F.

The treatment is considered complete and the shafts are turned off. The treated material is then removed from the tub by screw conveyor, elevated by bucket elevator, into a storage bin from which by air fluidized packers it is packaged in multiwall bags, or other suitable containers.

The microcrystalline novaculite treated under example is used in butyl splicing compounds to improve moisture resistance in that the microcrystalline novaculite surface has been altered from hydrophilic to hydrophobic and the mixing rheology has been improved as the triisostearate pendant groups on the surface have rendered the surface lubricous. Moreover, the treated material under example used to fill a high temperature silicone elastomer wherein the filled silicone composite is used to be molds for aluminum parts, increases high temperature mold life from 11 molded aluminum parts to 240 molded aluminum parts operating at a temperature in excess of 850° F.

EXAMPLE FIVE

PRODUCT TREATED 500 pounds of microcrystalline novaculite with an average particle size of 2.0 microns and a surface area of 2½ m²/g.

COUPLING CHEMICAL USED

A 50% solids Glass Resin thermoset silicone coupling agent solution described as siloxane chains with select OH groups in a 50% solvent solution of acetate.

Empirical formula

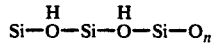

MIXER

Myers Engineering 550 Dual Range Disperser with tub for mixing, and other convenient and necessary appurtenances.

A quantity of microcrystalline novaculite weighing 500 pounds is placed in the mixing tub. After insertion of the microcrystalline novaculite the temperature is measured at 70° F. The lid over the tub is secured. The single speed, high speed shaft with a curcular mixing disc is switched on. Next, the variable speed, slow speed shaft with a blade is switched on to its maximum setting of 10.

14 minutes after both shafts have been switched on and the temperature of the microcrystalline novaculite mass in the tube has reached 140° F. the single speed, high speed shaft is allowed to run, the variable shaft with blade is reduced to a setting of one (1). Next, five pounds of 50% solids solution of Glass Resin dispersed in acetone is fed by gravity through an ½ inch pipe under a portable reservoir on legs, into and through an opening in the tub cover directly on and into the bed of microcrystalline novaculite being agitated by the high speed shaft and the slow speed variable speed shaft operating on a setting of one (1). After the 5 pounds of Glass Resin/Acetone solution has evacuated the reservoir on and into the mass of agitated microcrystalline novaculite, the opening on the tub lid is closed and the slow, variable speed shaft is moved to an operating position of 10.

75 minutes after the initial starting of both the single speed, high speed shaft and the variable slow speed shaft, the probing thermometer has reached 300° F.

The treatment is considered complete and the shafts are turned off. The treated material is then removed from the tub by screw conveyor, elevated by bucket elevator, into a storage bin from which it is packaged in multiwall bags or other suitable containers by ram-air fluopacker.

The microcrystalline novaculite treated under example is used as an extender filler in high temperature plastic/ceramic bodies to reinforce the composite. The surface treated material adheres to the matrix of the composite at the interface when typical organofunctional groups would breakdown under ceramic temperature parameter.

Although the present invention has been specified in detail with respect to certain preferred embodiments thereof, it is clear to those of skill in the art that variations and modifications in this detail may be effected without any departure from the spirit and scope of the present invention, as defined in the hereto-appended claims.

What is claimed is:

1. A process for the preparation of an improved modifier for both polymeric and ceramic compositions, which process comprises:
    (a) spraying or pouring between 0.01 and 5 percent by weight of an ambi- or monofunctional treating agent selected from the group consisting of silane coupling agents, titanate coupling agents having the general formula R₃—Ti X, wherein R is a group attached to the titanium in a thermally and hydrolytically stable manner and X is a hydrolyzable group, and glass resin thermoset silicone coupling agents in carrier solutions, onto an essentially dry hydrophilic inorganic solid selected from the group consisting of particulate crystalline inorganic solids, fibrous crystalline inorganic solids, particulate amorphous inorganic solids, and fibrous amorphous inorganic solids, the contact between the treating agent and the inorganic solid being effected while the inorganic solid is agitated in a high intensity mixing apparatus comprising a mixing chamber and a plurality of mixing blades contained therein which are driven at 200–18,000 RPM, at a temperature between about 70° F. and about 350° F.; and
    (b) allowing the treating agent and the inorganic solid to remain in situ at a temperature between about 70° F. and about 350° F. for at least about 1 minute.

2. The process of claim 1, wherein the frictional heat generated in the inorganic solid by the high intensity mixing apparatus is employed to effect the interaction between the treating agent and the inorganic solid.

3. The process of claim 1, wherein:
(a) the silane coupling agent is an organosilicon compound ambi- or monofunctional, having the general formula R—SiX$_3$, wherein R is a group attached to the silicon in a thermally and hydrolytically stable manner, R being selected from the class consisting of aliphatic, cycloaliphatic, aromatic, amino, polyamino, mercapto, methacrylo, glycidoxy, epoxy, vinyl, aminopropyl, mercaptopropyl, methacrylopropyl, methacryloxypropyl, glycidoxypropyl, epoxypropyl, chloroalkyl, and epoxycyclohexyl; and X is a hydrolyzable group selected from chlorine, bromine, iodine, alkoxy, and acetoxy;
(b) titatate coupling agent is an organotitanium compound, ambi- or monofunctional, having the general formula R$_3$—TiX, wherein R is a group attached to the titanium in a thermally and hydrolytically stable manner, R being selected from the class consisting of isostearoyl, lauryl-myristyl, isopropyl, dimethacryl, triacroyl, phosphito, dodecylbenzenesulfonyl, diacryl, diisooctylphospheto, 4-amino benezenesulfonyl, dioctylpyrophosphato, and X is a hydrolyzable group having a monoalkoxy structure;
(c) the glass resin thermoset silicone coupling agent is an ambi - or monofunctional structure comprising siloxane chains having the abbreviated formula

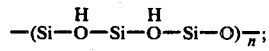

(d) the hydrophilic inorganic solid is a typical structure comprising at least one section wherein a three-dimensional periodic arrangement of atoms is interrupted at the surface of the solid.

4. The process of claim 3, wherein the surface of the hydrophilic inorganic solid comprises reactive hydroxyl functionalities.

* * * * *